US011443466B2

(12) United States Patent
Kanazawa et al.

(10) Patent No.: US 11,443,466 B2
(45) Date of Patent: Sep. 13, 2022

(54) IMAGE FORMING APPARATUS THAT RANDOMLY PROCESSES OUTLINE DATA IN ASSOCIATION WITH A CHARACTER CODE TO RENDER A CHARACTER IN DIFFERENT FORMS, IMAGE FORMING METHOD INCLUDING RANDOMLY PROCESSING OUTLINE DATA IN ASSOCIATION WITH A CHARACTER CODE TO RENDER A CHARACTER IN DIFFERENT FORMS, AND NON-TRANSITORY COMPUTER READABLE RECORDING MEDIUM THAT RECORDS AN INFORMATION PROCESSING PROGRAM THAT REALIZES THE IMAGE FORMING METHOD INCLUDING RANDOMLY PROCESSING OUTLINE DATA IN ASSOCIATION WITH A CHARACTER CODE TO RENDER A CHARACTER IN DIFFERENT FORMS

(71) Applicant: KYOCERA DOCUMENT SOLUTIONS INC., Osaka (JP)

(72) Inventors: Keizen Kanazawa, Concord, CA (US); Mike Maready, Sr., Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 29 days.

(21) Appl. No.: 16/985,466

(22) Filed: Aug. 5, 2020

(65) Prior Publication Data

US 2022/0044455 A1    Feb. 10, 2022

(51) Int. Cl.
*G06T 11/20*    (2006.01)
*G06K 15/02*    (2006.01)
(Continued)

(52) U.S. Cl.
CPC .......... *G06T 11/203* (2013.01); *G06F 40/109* (2020.01); *G06K 15/128* (2013.01); *G06K 15/1802* (2013.01)

(58) Field of Classification Search
None
See application file for complete search history.

(56) References Cited

U.S. PATENT DOCUMENTS 5,777,627 A * 7/1998 Takazawa ............. G06T 11/203
                                                 345/469
5,867,174 A * 2/1999 Aoki .................... G06T 11/203
                                                 345/472
(Continued)

FOREIGN PATENT DOCUMENTS

JP    05073027 A    3/1993
JP    05265429 A    10/1993

*Primary Examiner* — Jeffrey J Chow
(74) *Attorney, Agent, or Firm* — Li & Cai Intellectual Property (USA) Office (57) ABSTRACT

An image forming apparatus includes: a storage device that stores font data including a character code and outline data in association with the character code, the outline data being used to render a character specified by the character code; and a text processing unit configured to obtain, from the font data, the outline data in association with the character code included in the printable data, and a character rendering unit configured to process the outline data by changing a coordinate of a stroke, thickness of each line, and/or an interval between characters to thereby create processed outline data, the stroke being a center line of each line included in an object of the character rendered by using the outline data, and render an object of the character by using the processed outline data to thereby render the character specified by the same character code as a different object.

12 Claims, 4 Drawing Sheets

| Item | Variable range |
|---|---|
| Coordinate of stroke | ±2 dot |
| Thickness of line | ±3% |
| Interval between characters | 99 ~ 103% |

(51) Int. Cl.
*G06F 40/109* (2020.01)
*G06K 15/12* (2006.01)

(56) References Cited

U.S. PATENT DOCUMENTS

| | | | | |
|---|---|---|---|---|
| 6,275,237 | B1* | 8/2001 | Wu | G09G 5/246 |
| | | | | 345/551 |
| 7,535,471 | B1* | 5/2009 | Mansfield | G06T 11/203 |
| | | | | 345/467 |
| 2003/0128382 | A1* | 7/2003 | Brown | G06F 40/109 |
| | | | | 358/1.14 |
| 2010/0260420 | A1* | 10/2010 | D'Agostino | G06K 9/344 |
| | | | | 382/176 |
| 2012/0038735 | A1* | 2/2012 | Hasegawa | B41J 2/4753 |
| | | | | 347/217 |
| 2016/0180819 | A1* | 6/2016 | Chang | G09G 5/26 |
| | | | | 345/469 |
| 2018/0329622 | A1* | 11/2018 | Missig | G06F 3/0219 |
| 2020/0327276 | A1* | 10/2020 | Choi | G09G 5/20 |
| 2021/0141464 | A1* | 5/2021 | Jain | G06F 3/0236 |

* cited by examiner

IMAGE FORMING APPARATUS THAT RANDOMLY PROCESSES OUTLINE DATA IN ASSOCIATION WITH A CHARACTER CODE TO RENDER A CHARACTER IN DIFFERENT FORMS, IMAGE FORMING METHOD INCLUDING RANDOMLY PROCESSING OUTLINE DATA IN ASSOCIATION WITH A CHARACTER CODE TO RENDER A CHARACTER IN DIFFERENT FORMS, AND NON-TRANSITORY COMPUTER READABLE RECORDING MEDIUM THAT RECORDS AN INFORMATION PROCESSING PROGRAM THAT REALIZES THE IMAGE FORMING METHOD INCLUDING RANDOMLY PROCESSING OUTLINE DATA IN ASSOCIATION WITH A CHARACTER CODE TO RENDER A CHARACTER IN DIFFERENT FORMS

FIELD OF THE DISCLOSURE

The present disclosure relates to an image forming apparatus that renders characters specified by character codes included in printable data. The present disclosure further relates to an image forming method. The present disclosure further relates to a non-transitory computer readable recording medium that records an information processing program.

FIELD OF THE DISCLOSURE

There is known an image forming apparatus that renders characters specified by character codes included in printable data received from a host apparatus by using a font specified in the printable data.

SUMMARY OF THE DISCLOSURE

According to an embodiment of the present disclosure, there is provided an image forming apparatus, including:
a communication interface configured to receive printable data including a character code from a host apparatus;
a storage device that stores font data including a character code and outline data in association with the character code, the outline data being used to render a character specified by the character code; and
a controller circuitry configured to operate as
a text processing unit configured to obtain, from the font data, the outline data in association with the character code included in the printable data, and
a character rendering unit configured to
process the outline data by changing a coordinate of a stroke, thickness of each line, and/or an interval between characters to thereby create processed outline data, the stroke being a center line of each line included in an object of the character rendered by using the outline data, and
render an object of the character by using the processed outline data to thereby render the character specified by the same character code as a different object.

According to an embodiment of the present disclosure, there is provided an image forming method, including:
receiving printable data including a character code from a host apparatus;
obtaining, from font data stored in a storage device, the font data including a character code and outline data in association with the character code, the outline data being used to render a character specified by the character code, the outline data being in association with the character code included in the printable data;
processing the outline data by changing a coordinate of a stroke, thickness of each line, and/or an interval between characters to thereby create processed outline data, the stroke being a center line of each line included in an object of the character rendered by using the outline data; and
rendering an object of the character by using the processed outline data to thereby render the character specified by the same character code as a different object.

According to an embodiment of the present disclosure, there is provided a non-transitory computer readable recording medium that records an information processing program executable by a controller circuitry of an image forming apparatus including a communication interface configured to receive printable data including a character code from a host apparatus, a storage device that stores font data including a character code and outline data in association with the character code, the outline data being used to render a character specified by the character code, and the controller circuitry, the information processing program causing the controller circuitry to operate as
a text processing unit configured to obtain, from the font data, the outline data in association with the character code included in the printable data, and
a character rendering unit configured to
process the outline data by changing a coordinate of a stroke, thickness of each line, and/or an interval between characters to thereby create processed outline data, the stroke being a center line of each line included in an object of the character rendered by using the outline data, and
render an object of the character by using the processed outline data to thereby render the character specified by the same character code as a different object.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. HARDWARE CONFIGURATION OF IMAGE FORMING APPARATUS

Figure 1:
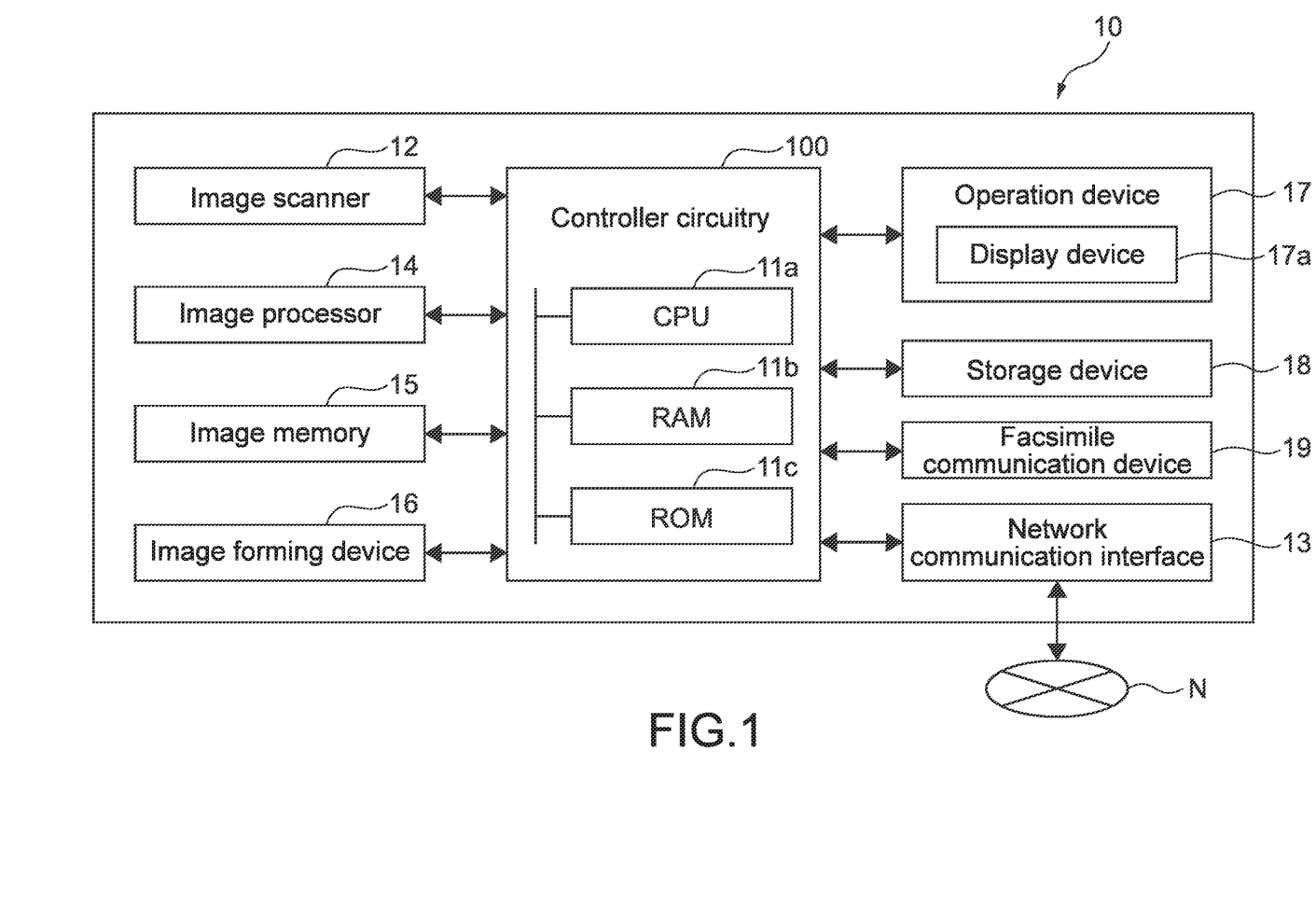
FIG. 1 shows a hardware configuration of an image forming apparatus according to an embodiment of the present disclosure.

FIG. 1 shows a hardware configuration of an image forming apparatus.

The image forming apparatus 10 includes the controller circuitry 100. The controller circuitry 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs (including image processing program) stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 100 is connected to the image scanner 12, the image processor 14 (including GPU (Graphics Processing Unit)), the image memory 15, the image forming device 16 (printer device), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 including the display device 17a (touch panel) is one mode of an input device. A sound input device including a microphone may be provided as an input device.

2. FUNCTIONAL CONFIGURATION OF IMAGE FORMING APPARATUS

Figure 2:
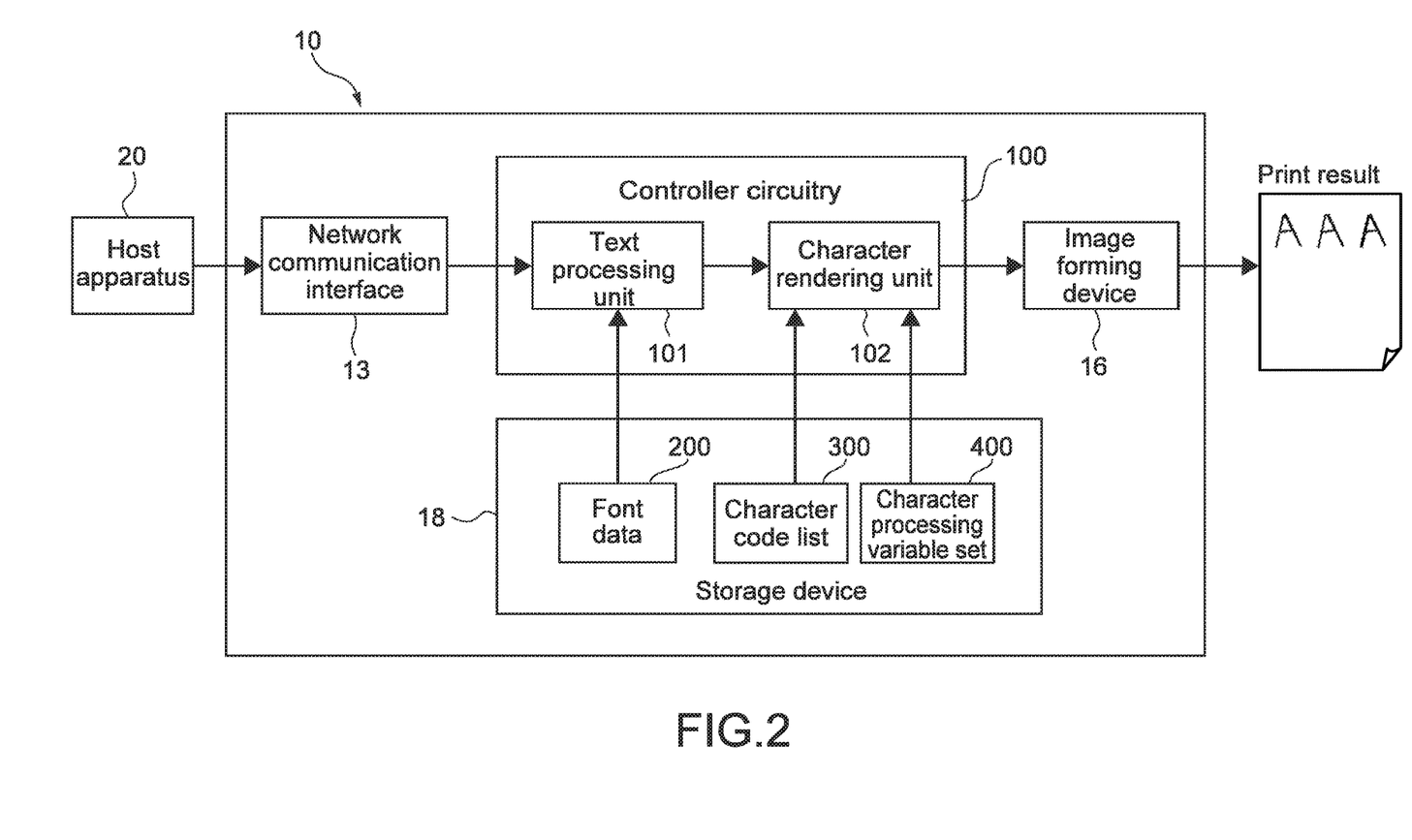
FIG. 2 is a functional configuration of the image forming apparatus.

FIG. 2 is a functional configuration of the image forming apparatus.

In the controller circuitry 100 of the image forming apparatus 10, the CPU 11a loads an information processing program stored in the ROM 11c in the RAM 11b and executes the information processing program to operate as the text processing unit 101 and the character rendering unit 102.

The storage device 18 stores the font data 200, the character code list 300, and the character processing variable set 400.

In the character code list 300, multiple character codes in association with outline data which should not be processed are registered. In the character code list 300, for example, the character codes (for example, U+1F430 (rabbit face)) included in "Emoji and Pictographs" of "Unicode 13.0 Character Code Charts" are registered.

3. STRUCTURE OF FONT DATA

Figure 3:
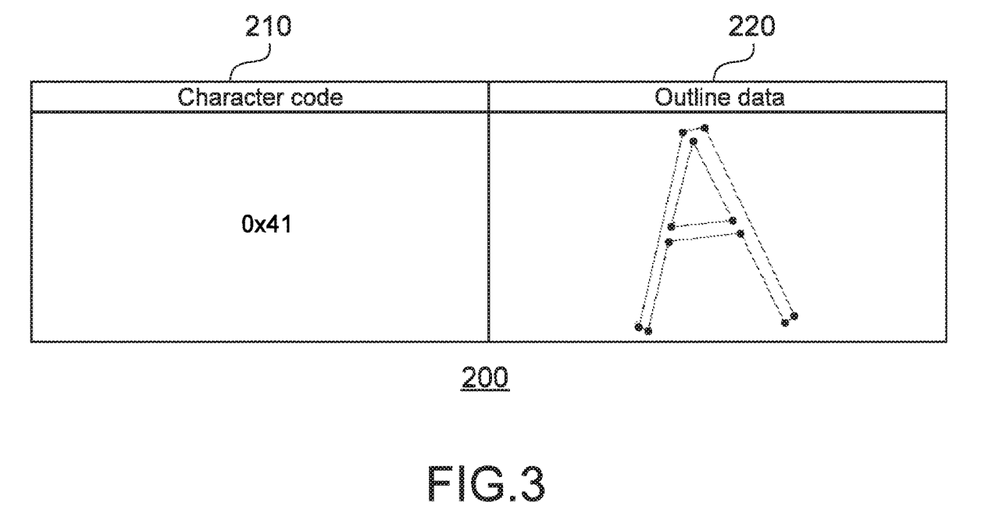
FIG. 3 schematically shows a structure of font data.

FIG. 3 schematically shows a structure of font data.

The font data 200 is used to render one certain kind of font (typically, handwritten font). The font data 200 includes the character code 210, and the one outline data 220 in association with the character code 210. For example, the one outline data 220 is in association with the character code 210 "0x41" (which means "capital letter A"). The outline data 220 is used to render a character specified by the character code 210 (for example, "capital letter A" specified by the character code 210 "0x41"). The outline data 220 includes multiple dots and multiple straight lines.

4. STRUCTURE OF CHARACTER PROCESSING VARIABLE SET

Figure 4:
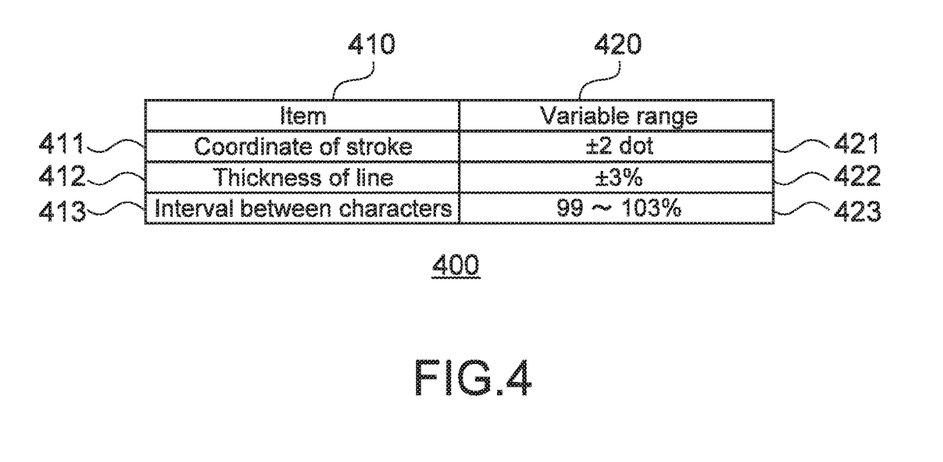
FIG. 4 schematically shows a structure of a character processing variable set.

FIG. 4 schematically shows a structure of a character processing variable set.

The character processing variable set 400 includes the item 410 and the variable range 420 in association with each item 410. Outline data corresponding to the item 410 is to be processed.

The variable range "±2 dots" 421 is in association with the item "coordinate of stroke" 411. The variable range "±3%" 422 is in association with the item "thickness of line" 412. The variable range "99 to 103%" 423 is in association with the item "interval between characters" 413.

5. OPERATIONAL FLOW OF IMAGE FORMING APPARATUS

Figure 5:
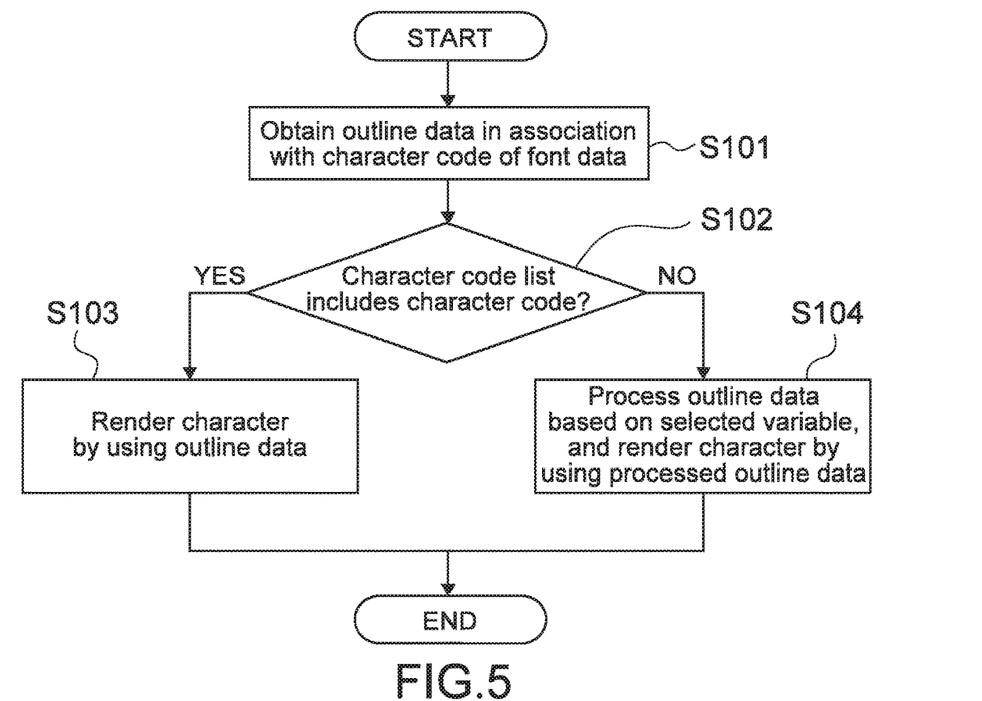
FIG. 5 shows an operational flow of the image forming apparatus.

FIG. 5 shows an operational flow of the image forming apparatus.

The image forming apparatus 10 receives printable data from the host apparatus 20 connected to the network N via the network communication interface 13. The printable data is described in, for example, a PDL (Page Description Language). The printable data includes character codes. The printable data may further include a rendering attribute (character color, background color (highlight), font size, italic, bold, etc.).

The text processing unit 101 detects a character code included in the printable data. The text processing unit 101 obtains the outline data 220 in association with the character code 210 of the font data 200 (Step S101). The character rendering unit 102 determines whether or not the character code list 300 includes the character code included in the printable data (Step S102).

Where the character code list 300 includes the character code included in the printable data (Step S102, YES), the character rendering unit 102 renders an object of the character by using the outline data 220 obtained from the font data 200 (Step S103).

Meanwhile, where the character code list 300 does not include the character code included in the printable data (Step S102, NO), the character rendering unit 102 randomly selects a variable from the variable range 420 included in the character processing variable set 400. The character rendering unit 102 processes the outline data 220 by changing the coordinate of the stroke 411, the thickness of each line 412, and/or the interval between characters 413 based on the selected variable. As a result, the character rendering unit 102 creates processed outline data. The character rendering unit 102 renders an object of the character by using the processed outline data to thereby render the character specified by the same character code as a different object (Step S104). "Changing the coordinate of the stroke 411, the thickness of each line 412, and/or the interval between characters 413" means to change any one of, any two of, and all the three of "the coordinate of the stroke 411, the thickness of each line 412, and the interval between characters 413".

Where the printable data includes a rendering attribute (character color, background color (highlight), font size, italic, bold, etc.), the character rendering unit 102 renders the character based on the rendering attribute and creates bitmap data (Step S103 or Step S104). The image forming device 16 outputs the bitmap data and obtains a print result (FIG. 2).

Specific examples of the method (Step S104) of processing an object of a character by the character rendering unit 102 will be described.

Figure 6:
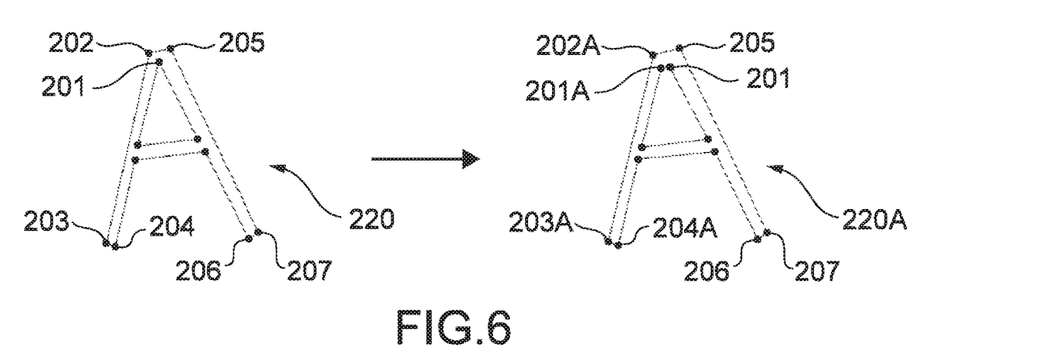
FIG. 6 schematically shows a method of changing a coordinate of a stroke.

FIG. 6 schematically shows a method of changing a coordinate of a stroke.

A "stroke" is a center line of each line included in an object of a character rendered by using the outline data the outline data 220. Typically, the outline data 220 of a font does not include stroke information. So the character rendering unit 102 has to calculate a stroke from the outline data 220. Typically, a handwritten font does not have serif (additional small lines). So the character rendering unit 102 may calculate a stroke from the outline data 220 relatively easily. The character rendering unit 102 changes (relocates) the coordinate of the calculated stroke to thereby create processed outline data. The character rendering unit 102 randomly determines a line to be relocated and a change quantity (relocation quantity). In the example of FIG. 4, the range of the change quantity (relocation quantity) is from −2 dots to +2 dots. Alternatively, for example, the range may be from 0 dot to 3 dots, from 0% to 10% of a line thickness, or the like.

In the example of FIG. 6, the outline data 220 (same as FIG. 4) is processed and the processed outline data 220A is thereby created. In the present example, the coordinate of the stroke (center line equidistant from the line connecting the dots 202 and 203 and the line connecting the dots 201 and 204) of the line (area between the line connecting the dots 202 and 203 and the line connecting the dots 201 and 204), which extends from top to bottom at the left side of the outline data 220, is relocated. Specifically, the coordinates of the stroke are relocated in parallel in the left direction of FIG. 6 (direction going apart from the center of the object of the character) by the same change quantity (relocation quantity) (In the example of FIG. 4, arbitrary value selected from −2 dots≤relocation quantity<0 dot). As a result, the processed outline data 220A is created. The processed outline data 220A includes the dots 201A, 202A, 203A, and 204A created by relocating the dots 201, 202, 203, and 204 (included in the outline data 220) in parallel in the left direction of FIG. 6. Meanwhile, the stroke of the line including the dots 201, 205, 206, and 207 (included in the outline data 220) are not relocated. As a result, the processed outline data 220A additionally includes the dot 201A at the left side of the dot 201.

Figure 7:
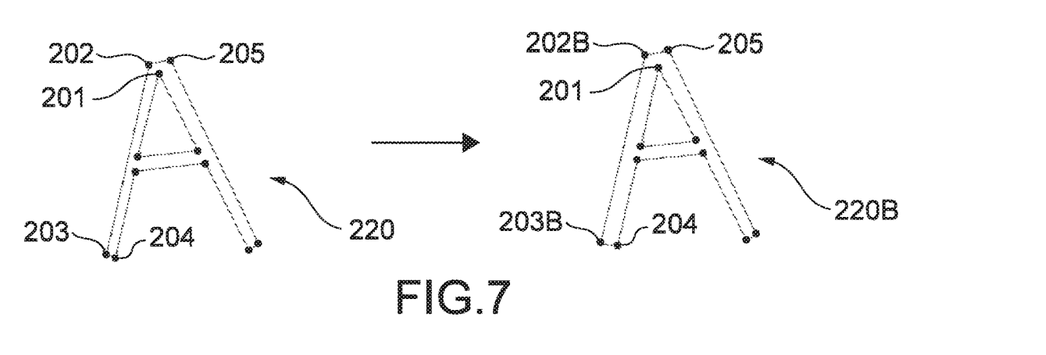
FIG. 7 schematically shows a method of changing the thickness of a line.

FIG. 7 schematically shows a method of changing the thickness of a line.

The character rendering unit 102 randomly determines a line whose thickness (line thickness) is to be changed, and the change quantity (increment of thickness). In the example of FIG. 4, the range of the change quantity (increment of thickness) is from −3% to +3%. Alternatively, for example, the range may be from 95% to 105% of a line thickness, or the like.

In the example of FIG. 7, the outline data 220 (same as FIG. 4) is processed and the processed outline data 220B is thereby created. In the present example, the line thickness of the line (area between the line connecting the dots 202 and 203 and the line connecting the dots 201 and 204), which extends from top to bottom at the left side of the outline data 220, is changed (thickened) by a change quantity (increment of thickness) (In the example of FIG. 4, arbitrary value selected from 0%<increment≤+3%). As a result, the processed outline data 220B is created. The processed outline data 220B includes the line connecting the dots 202B and 203B, which are relocated in parallel in the left direction of FIG. 7, and the line connecting the dots 201 and 204, which are not relocated. As a result, in the processed outline data 220B, the line thickness of the line (area between the line connecting the dots 202B and 203B and the line connecting the dots 201 and 204), which extends from top to bottom at the left side, is thickened.

In order to change the interval between characters, the character rendering unit 102 changes the escapement and thereby changes the position of the next (adjacent) character. The variation of the escapement may be set from 95% to 105%, for example.

The variable range 420 may be manually set by a user and/or a default value may be set. To set the variable range 420 manually by a user, for example, the variable range 420 may be set via a printer driver of the host apparatus 20.

6. CONCLUSION

There is known a handwritten font set used to render pseudo-handwritten texts used in, for example, a word processor software. Typically, one kind of font set has one outline data for one character code. The same characters are always rendered by using the one same outline data. So the same characters always have the shame shape as a rule. Characters are rendered based on rendering attributes, i.e., with the size changed, with the length-to-width ratio changed, and obliquely (italic). Character objects are created by processing outline data uniformly based on predetermined calculations. So the print result can be always the same. However, when a person actually handwrites the same characters, the shapes are different from each other. So, even if a handwritten font set is used, it is difficult to render natural pseudo-handwritten characters that look like human handwritten characters.

(1) In view of the aforementioned circumstances, according to the present embodiment, the text processing unit 101 obtains, from the font data 200, the outline data 220 in association with the character code included in the printable data. The character rendering unit 102 processes the outline data 220 by changing a coordinate of a stroke, thickness of each line, and/or an interval between characters to thereby create processed outline data 220, the stroke being a center line of each line included in an object of the character rendered by using the outline data 220, and renders an object of the character by using the processed outline data 220 to thereby render the character specified by the same character code as a different object. Therefore, by randomly processing one outline data 220, the character specified by the same character code 210 is rendered in a different touch. In one use case, in a handwritten font format, the same characters, which appear several times, are rendered in different forms. As a result, handwritten characters more and more look like a real handwritten touch. In other words, by using the different outline data 220 every time, the rendering result of the same character is different every time. As a result, the rendering result may look like natural and real handwritten characters.

(2) According to the present embodiment, the character rendering unit 102 randomly selects a variable from the variable range 420 included in the character processing variable set 400, and processes the outline data 220 by changing the coordinate of the stroke, the thickness of each line, and/or the interval between characters based on the selected variable to thereby create the processed outline data. As a result, the same characters, which appear several times, are rendered in different forms randomly. As a result, handwritten characters more and more look like a real handwritten touch.

(3) According to the present embodiment, the character rendering unit 102, where the character code list 300 includes the character code included in the printable data, does not create the processed outline data, and renders an object of the character by using the outline data obtained from the font data. As a result, for example, emoji and the like are not processed, and the output result thereby has a high quality.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a communication interface configured to receive printable data including a character code from a host apparatus;
a storage device that stores font data including a character code and outline data in association with the character code, the outline data being used to render a character specified by the character code, the outline data including multiple dots and multiple straight-lines; and
a controller circuitry configured to operate as
a text processing unit configured to obtain, from the font data, the outline data in association with the character code included in the printable data, and
a character rendering unit configured to
process the outline data by changing a coordinate of a stroke and/or changing thickness of each line, and changing an interval between characters to thereby create processed outline data, the stroke being a center line of each line included in an object of the character rendered by using the outline data, and
render an object of the character by using the processed outline data to thereby render the character specified by the same character code as a different object, wherein
the character rendering unit changes the coordinate of the stroke by relocating the coordinate of the stroke in parallel including relocating two dots that form a straight-line extending in a direction of a line of a character and relocating two dots that form another straight-line extending in the direction of the line of the character in parallel in a direction going apart from a center of the character by a same relocation quantity, without relocating a stroke of another line of the character, to thereby create processed outline data,
the character rendering unit changes the thickness by relocating two dots that form a straight-line extending in a direction of a line of a character in parallel and not relocating two dots that form another straight-line extending in the direction of the line of the character, without changing a thickness of another line of the character, to thereby create processed outline data,
the character rendering unit changes the interval between characters by changing escapement to thereby change a position of a next character, and
the character rendering unit randomly processes one outline data to thereby render a same character specified by a same character code in different touches and in different forms, and obtains different rendering results for the same character.

2. The image forming apparatus according to claim 1, wherein
the storage device further stores a character processing variable set, the character processing variable set indicating a variable range of the coordinate of the stroke, the thickness of each line, and the interval between characters, and the character rendering unit is configured to
randomly select a variable from the variable range included in the character processing variable set, and
process the outline data by changing the coordinate of the stroke, the thickness of each line, and the interval between characters based on the selected variable to thereby create the processed outline data.

3. The image forming apparatus according to claim 1, wherein
the storage device further stores a character code list, a character code in association with outline data which should not be processed being registered in the character code list, and
the character rendering unit is configured
where the character code list includes the character code included in the printable data, not to create the processed outline data, and render an object of the character by using the outline data obtained from the font data, and
where the character code list does not include the character code included in the printable data, to create the processed outline data, and render an object of the character by using the processed outline data.

4. The image forming apparatus according to claim 3, wherein
a character code of an emoji or a pictograph is registered in the character code list.

5. An image forming method, comprising:
receiving printable data including a character code from a host apparatus;
obtaining, from font data stored in a storage device, the font data including a character code and outline data in association with the character code, the outline data being used to render a character specified by the character code, the outline data being in association with the character code included in the printable data, the outline data including multiple dots and multiple straight-lines;
processing the outline data by changing a coordinate of a stroke and/or changing thickness of each line, and changing an interval between characters to thereby create processed outline data, the stroke being a center line of each line included in an object of the character rendered by using the outline data; and
rendering an object of the character by using the processed outline data to thereby render the character specified by the same character code as a different object, wherein
the step of changing the coordinate of the stroke by relocating the coordinate of the stroke in parallel includes relocating two dots that form a straight-line extending in a direction of a line of a character and relocating two dots that form another straight-line extending in the direction of the line of the character in parallel in a direction going apart from a center of the character by a same relocation quantity, without relocating a stroke of another line of the character, to thereby create processed outline data,
the step of changing the thickness includes relocating two dots that form a straight-line extending in a direction of a line of a character in parallel and not relocating two dots that form another straight-line extending in the direction of the line of the character, without changing a thickness of another line of the character, to thereby create processed outline data, the step of changing the interval between characters includes changing escapement to thereby change a position of a next character, and the step of processing the outline data includes randomly processing one outline data to thereby render a same character specified by a same character code in different touches and in different forms, and obtaining different rendering results for the same character.

6. The image forming method according to claim 5, wherein the storage device further stores a character processing variable set, the character processing variable set indicating a variable range of the coordinate of the stroke, the thickness of each line, and the interval between characters, the image forming method further comprising:

randomly selecting a variable from the variable range included in the character processing variable set; and processing the outline data by changing the coordinate of the stroke, the thickness of each line, and the interval between characters based on the selected variable to thereby create the processed outline data.

7. The image forming method according to claim 5, wherein the storage device further stores a character code list, a character code in association with outline data which should not be processed being registered in the character code list, the image forming method further comprising:

where the character code list includes the character code included in the printable data, not creating the processed outline data, and rendering an object of the character by using the outline data obtained from the font data, and where the character code list does not include the character code included in the printable data, creating the processed outline data, and rendering an object of the character by using the processed outline data.

8. The image forming method according to claim 7, wherein a character code of an emoji or a pictograph is registered in the character code list.

9. A non-transitory computer readable recording medium that records an information processing program executable by a controller circuitry of an image forming apparatus including a communication interface configured to receive printable data including a character code from a host apparatus, a storage device that stores font data including a character code and outline data in association with the character code, the outline data being used to render a character specified by the character code, the outline data including multiple dots and multiple straight-lines, and the controller circuitry, the information processing program causing the controller circuitry to operate as a text processing unit configured to obtain, from the font data, the outline data in association with the character code included in the printable data, and a character rendering unit configured to process the outline data by changing a coordinate of a stroke and/or changing thickness of each line, and changing an interval between characters to thereby create processed outline data, the stroke being a center line of each line included in an object of the character rendered by using the outline data, and render an object of the character by using the processed outline data to thereby render the character specified by the same character code as a different object, wherein the character rendering unit changes the coordinate of the stroke by relocating the coordinate of the stroke in parallel including relocating two dots that form a straight-line extending in a direction of a line of a character and relocating two dots that form another straight-line extending in the direction of the line of the character in parallel in a direction going apart from a center of the character by a same relocation quantity, without relocating a stroke of another line of the character, to thereby create processed outline data, the character rendering unit changes the thickness by relocating two dots that form a straight-line extending in a direction of a line of a character in parallel and not relocating two dots that form another straight-line extending in the direction of the line of the character, without changing a thickness of another line of the character, to thereby create processed outline data, the character rendering unit changes the interval between characters by changing escapement to thereby change a position of a next character, and the character rendering unit randomly processes one outline data to thereby render a same character specified by a same character code in different touches and in different forms, and obtains different rendering results for the same character.

10. The non-transitory computer readable recording medium according to claim 9, wherein the storage device further stores a character processing variable set, the character processing variable set indicating a variable range of the coordinate of the stroke, the thickness of each line, and the interval between characters, and the character rendering unit is configured to randomly select a variable from the variable range included in the character processing variable set, and process the outline data by changing the coordinate of the stroke, the thickness of each line, and the interval between characters based on the selected variable to thereby create the processed outline data.

11. The non-transitory computer readable recording medium according to claim 9, wherein the storage device further stores a character code list, a character code in association with outline data which should not be processed being registered in the character code list, and the character rendering unit is configured where the character code list includes the character code included in the printable data, not to create the processed outline data, and render an object of the character by using the outline data obtained from the font data, and where the character code list does not include the character code included in the printable data, to create the processed outline data, and render an object of the character by using the processed outline data.

12. The non-transitory computer readable recording medium according to claim 11, wherein a character code of an emoji or a pictograph is registered in the character code list.

* * * * *